United States Patent
Nagao

(10) Patent No.: US 10,972,885 B2
(45) Date of Patent: Apr. 6, 2021

(54) PROGRAM OF SHORT RANGE COMMUNICATION APPARATUS, PROGRAM OF PORTABLE APPARATUS AND SYSTEM COMPRISING THESE APPARATUSES

(71) Applicant: BROTHER KOGYO KABUSHIKI KAISHA, Nagoya (JP)

(72) Inventor: Satoki Nagao, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 5 days.

(21) Appl. No.: 15/415,100

(22) Filed: Jan. 25, 2017

(65) Prior Publication Data

US 2017/0280275 A1  Sep. 28, 2017

(30) Foreign Application Priority Data

Mar. 25, 2016 (JP) .............................. JP2016-062109

(51) Int. Cl.
*H04W 4/02* (2018.01)
*H04W 4/80* (2018.01)
(Continued)

(52) U.S. Cl.
CPC ............ *H04W 4/80* (2018.02); *H04W 4/023* (2013.01); *H04W 76/14* (2018.02); *H04W 76/11* (2018.02); *H04W 84/18* (2013.01)

(58) Field of Classification Search
CPC ....... H04W 4/80; H04W 76/11; H04W 76/14; H04W 4/023; H04W 76/021; H04W 76/023; H04W 4/008; H04W 84/18
See application file for complete search history.

(56) References Cited

U.S. PATENT DOCUMENTS 7,158,756 B2 *  1/2007  Palin ....................... H04L 63/18
                                                      380/270
8,880,055 B1 *  11/2014  Clement ............ G06Q 20/3278
                                                      455/410
(Continued)

FOREIGN PATENT DOCUMENTS

JP  2012-203742 A  10/2012
JP  2014-120822 A   6/2014
(Continued)

OTHER PUBLICATIONS

Office Action (Notification of Reason for Rejection) issued in Japanese Patent Application No. 2016-062109, dated Jan. 7, 2020.
(Continued)

*Primary Examiner* — Steven S Kelley
(74) *Attorney, Agent, or Firm* — Merchant & Gould P.C.

(57) ABSTRACT

A non-transitory computer-readable storage medium storing computer-readable instructions for a short range communication apparatus, when executed by a processor of the short range communication apparatus, may cause the short range communication apparatus to perform: receiving connection information from an image forming apparatus via a short range wireless communication established between a short range communication interface and the image forming apparatus; and storing the received connection information in a memory, sending the connection information, portable-program-identification information, and an executing instruction to the portable apparatus via the wireless interface, the portable-program-identification information being information for identifying the portable program, the executing instruction being an instruction for the portable program to establish the second wireless communication with the image forming apparatus using the connection information.

18 Claims, 11 Drawing Sheets

(51) Int. Cl.
*H04W 76/11* (2018.01)
*H04W 76/14* (2018.01)
*H04W 84/18* (2009.01)

(56) References Cited

U.S. PATENT DOCUMENTS

| | | | |
|---|---|---|---|
| 9,753,684 B1* | 9/2017 | Najari | G06F 3/1272 |
| 10,181,096 B2* | 1/2019 | Amano | G06F 3/1292 |
| 10,547,992 B2* | 1/2020 | Wada | H04W 4/80 |
| 2011/0292445 A1* | 12/2011 | Kato | G06F 3/1222 358/1.15 |
| 2012/0243043 A1 | 9/2012 | Asai | |
| 2012/0309309 A1* | 12/2012 | Cho | H04W 76/14 455/41.1 |
| 2015/0030012 A1* | 1/2015 | Narita | H04W 76/023 370/338 |
| 2015/0044970 A1* | 2/2015 | Park | H04W 76/10 455/41.2 |
| 2015/0163371 A1 | 6/2015 | Asai | |
| 2016/0044446 A1 | 2/2016 | Futatsumori | |
| 2017/0154327 A1 | 6/2017 | Zhao et al. | |

FOREIGN PATENT DOCUMENTS

| | | |
|---|---|---|
| JP | 2016-39571 A | 3/2016 |
| WO | 2016/023152 A1 | 2/2016 |

OTHER PUBLICATIONS

Notification of Reasons for Rejection issued in related Japanese Patent Application No. 2016-062109, dated Oct. 29, 2019.
Osamu Takizawa, Proceedings of the 2013 IEIC EEngineering Science Society Conference, AI-3-4, Section 3.2, Sep. 2013.
Akira Fujii, Forum on Information Technology 2011, M-018, Section 2.3, 2011.
Office Action (Notification of Reason for Rejection) issued in related Japanese Patent Application No. 2020-070491, dated Feb. 9, 2021.

* cited by examiner (First Embodiment)(SSID Receiving Process)

FIG. 6 (First Embodiment)(SSID Receiving Process)

PROGRAM OF SHORT RANGE COMMUNICATION APPARATUS, PROGRAM OF PORTABLE APPARATUS AND SYSTEM COMPRISING THESE APPARATUSES

CROSS REFERENCE TO RELATED APPLICATION

This application claims priority from Japanese Patent Application No. 2016-062109 filed Mar. 25, 2016. The entire content of the priority application is incorporated herein by reference.

TECHNICAL FIELD

The technique disclosed herein relates to a short range communication apparatus, and a portable apparatus capable of executing a communication with the short range communication apparatus.

DESCRIPTION OF RELATED ART

A technique is known in which a portable apparatus establishes a wireless communication with an image forming apparatus by using connection information. Specifically, the portable apparatus receives the connection information from the image forming apparatus via a first interface, and establishes the wireless communication via a second interface by using that connection information.

SUMMARY

In the aforementioned technique, a user of the portable apparatus cannot instruct the image forming apparatus to form an image in a case where the portable apparatus cannot use the first interface.

A non-transitory computer-readable storage medium disclosed herein may store computer-readable instructions for a short range communication apparatus, wherein the short range communication apparatus may comprise: a memory; a short range communication interface configured to execute a short range wireless communication with an external apparatus, the short range wireless communication being established by a trigger that a distance between the short range communication interface and the external apparatus becomes equal to or less than a short range distance; and a wireless interface configured to execute a first wireless communication with an external apparatus, the first wireless communication having a longer communication distance than the short range wireless communication, the computer-readable instructions, when executed by a processor of the short range communication apparatus, cause the short range communication apparatus to perform: receiving connection information from an image forming apparatus via the short range wireless communication established between the short range communication interface and the image forming apparatus; and storing the received connection information in the memory, wherein the connection information is necessary information for a portable apparatus to execute a second wireless communication with the image forming apparatus, the portable apparatus is an apparatus capable of executing a portable program for instructing the image forming apparatus to form an image via the second wireless communication, the second wireless communication has a longer communication distance than the short range wireless communication; and the computer-readable instructions cause the short range communication apparatus to further perform sending the connection information, portable-program-identification information, and an executing instruction to the portable apparatus via the wireless interface, the portable-program-identification information being information for identifying the portable program, the executing instruction being an instruction for the portable program to establish the second wireless communication with the image forming apparatus using the connection information.

Another non-transitory computer-readable storage medium disclosed herein may store computer-readable instructions for a portable apparatus, wherein the portable apparatus may comprise: a memory; a user interface; a first wireless interface configured to execute a first wireless communication with an external apparatus, the first wireless communication having a longer communication distance than a short range wireless communication; and a second wireless interface configured to execute a second wireless communication with an external apparatus, the second wireless communication having a longer communication distance than the short range wireless communication, the computer-readable instructions, when executed by a processor of the portable apparatus, cause the portable apparatus to perform: accepting a first operation for instructing an image forming apparatus to form an image via the user interface; and accepting a second operation via the user interface, wherein the second operation is an operation for instructing to execute the second wireless communication with the image forming apparatus via the second wireless interface using connection information received from a short range communication apparatus, the short range communication apparatus is an apparatus which obtains the connection information from the image forming apparatus via the short range wireless communication, the computer-readable instructions cause the portable apparatus to further perform: receiving the connection information from the short range communication apparatus via the first wireless interface; causing the second wireless interface to establish the second wireless communication with the image forming apparatus using the connection information in response to the receiving of the connection information, the accepting of the first operation, and the accepting of the second operation; and instructing the image forming apparatus to form the image via the second wireless interface establishing the second wireless communication.

Notably, the short range communication apparatus and the portable apparatus for implementation of the aforementioned technique are also novel and useful. Further, a communication system comprising the short range communication apparatus and a portable apparatus is also novel and useful.

EMBODIMENT

First Embodiment

Figure 1:
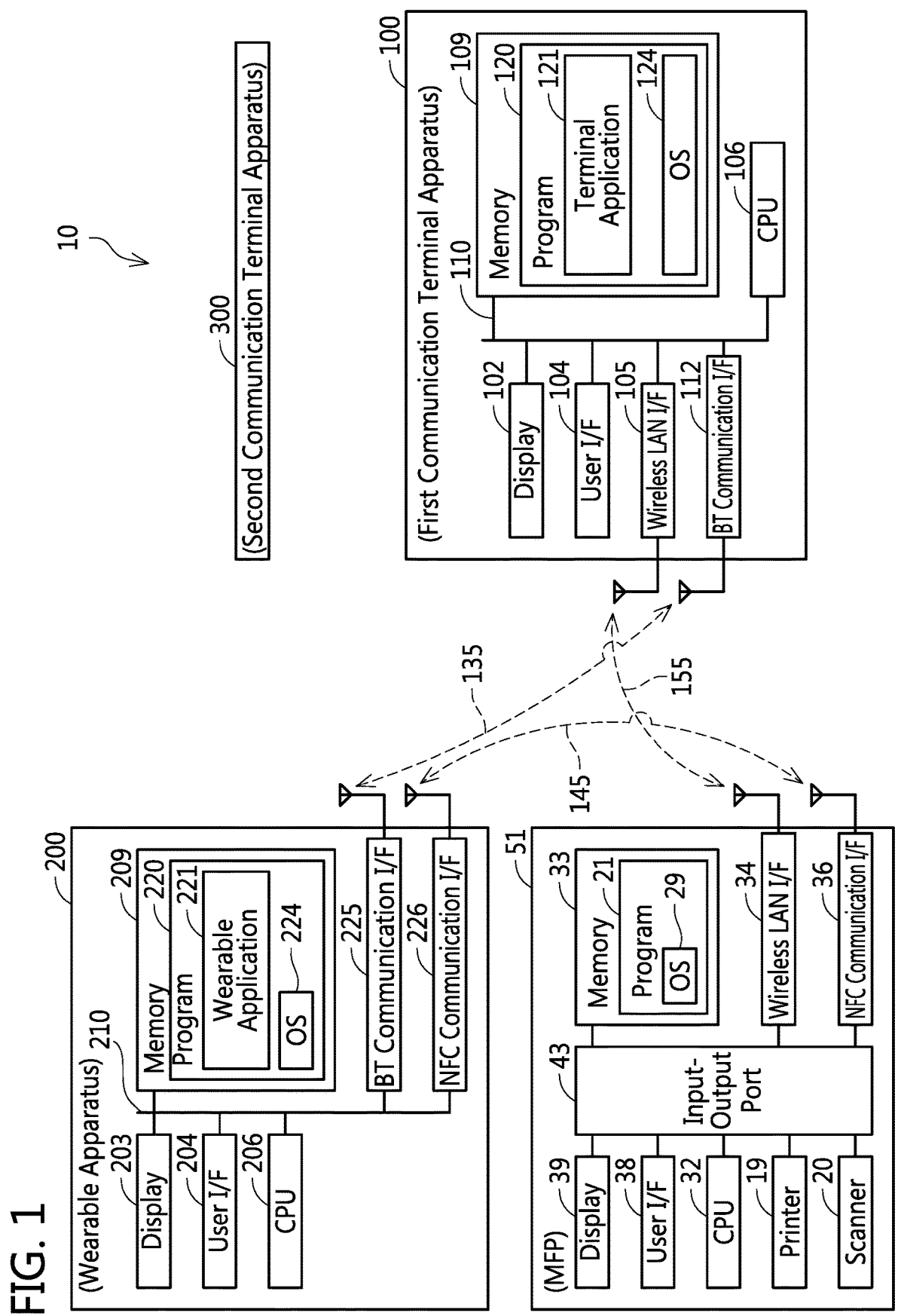
FIG. 1 is a block diagram showing a configuration of a network.

FIG. 1 is a block diagram showing a configuration of a network 10. The network 10 comprises a first communication terminal apparatus 100, a second communication terminal apparatus 300, an MFP 51, and a wearable apparatus 200. Here, MFP (abbreviation of Multifunction Peripheral) indicates a multifunction peripheral apparatus comprising a print function, a scan function, and a copy function.

The communication terminal apparatuses 100, 300 are portable apparatuses such as, e.g. a smart phone, a tablet, etc. The first communication terminal apparatus 100 comprises a display 102, a user I/F 104, a wireless LAN I/F 105, a BT communication I/F 112, a CPU 106, a memory 109, etc. and these are connected with one another via an input-output port 110.

The display 102 is, e.g. an LCD or an organic EL panel. The user I/F 104 may be a touch sensor disposed so as to overlap the display 102. The user I/F 104 may be an operation button. The CPU 106 accepts, via the user I/F 104, a user operation for designating an object displayed on the display 102, and a user operation for inputting a character string or a number string. "Object" includes, e.g., a character string, an icon, a button, a link, etc.

The BT communication I/F 112 is an interface for executing a BT communication 135 conforming to Bluetooth (registered trademark of Bluetooth SIG) standard. A communication distance of the BT communication 135 is longer than a communication distance of an NFC communication 145 conforming to NFC (abbreviation of Near Field Communication) standard, to be described. The wireless LAN I/F 105 is an interface for executing a WFD communication 155 conforming to Wi-Fi Direct (registered trademark of Wi-Fi Alliance, referred to as WFD below) standard. Notably, the wireless LAN I/F 105 may also be capable of executing a WF communication conforming to Wi-Fi (registered trademark of Wi-Fi Alliance) standard. Communication distances of the WFD communication 155 and the WF communication are longer than the communication distances of the NFC communication 145 and the BT communication 135.

The CPU 106 executes a program stored in the memory 109. The memory 109 temporarily stores information necessary for processes of the CPU 106. The memory 109 is constituted by a combination of a ROM, a RAM, a flash memory, an HDD, a buffer of the CPU 106, etc. Image data and the like can be stored in the memory 109. The memory 109 stores a program 120. The program 120 comprises a terminal application 121, and an operating system 124 (referred to as OS 124 below).

The terminal application 121 is an application program for causing the CPU 106 to execute a process of instructing the MFP 51 to print image data, etc. The OS 124 is, e.g., Android (registered trademark of Google Inc.) OS, iOS (registered trademark of Cisco Systems, Inc.), or the like. The OS 124 includes a program for causing each of the wireless LAN I/F 105 and the BT communication I/F 112 to execute a wireless communication. It should be noted that the second communication terminal apparatus 300 comprises the same configuration as the first communication terminal apparatus 100, but is illustrated in a simplified manner.

The MFP 51 mainly comprises a CPU 32, a memory 33, a wireless LAN I/F 34, an NFC communication I/F 36, a user I/F 38, a display 39, a printer 19, and a scanner 20. These constituent elements are capable of communicating with one another via an input-output port 43. The CPU 32, the memory 33, the wireless LAN I/F 34, the user I/F 38, and the display 39 comprise the same configurations respectively as the CPU 106, the memory 109, the wireless LAN I/F 105, the user I/F 104, and the display 102.

The CPU 32 executes a program 21 stored in the memory 33. The memory 33 stores the program 21. The program 21 includes an OS 29, etc.

The NFC communication I/F 36 is an interface for executing the NFC communication 145. The NFC standard of the present embodiment is, e.g., a standard based on international standard ISO/IEC 21481 or 18092. In the present embodiment, an NFC communication I/F 226 of the wearable apparatus 200 executes a Poll operation that repeatedly outputs a polling signal. The NFC communication I/F 226 monitors the polling signal, and executes a Listen operation that outputs a response signal on condition of receiving the polling signal. When the wearable apparatus 200 and the MFP 51 approach each other with a distance therebetween being equal to or less than the NFC communication distance, the polling signal and the response signal are exchanged, and a link of the NFC communication 145 is established according to a predetermined procedure conforming to the NFC standard. That is, the NFC communication 145 is a wireless communication established by a trigger that a distance between apparatuses (more specifically, between NFC communication I/Fs) becomes equal to or less than a short range distance. Notably, the MFP 51 may execute the Poll operation, and the wearable apparatus 200 may execute the Listen operation. The printer 19 comprises a mechanical configuration for executing a print using image data stored in the memory 33. The scanner 20 comprises a mechanical configuration for executing a reading.

The wearable apparatus 200 is a wrist band type apparatus (e.g., a wristwatch). The wearable apparatus 200 mainly comprises a CPU 206, a memory 209, a BT communication I/F 225, the NFC communication I/F 226, a display 203, and a user I/F 204. These are connected with one another via an input-output port 210. The CPU 206, the memory 209, the BT communication I/F 225, the NFC communication I/F 226, the display 203, and the user I/F 204 comprise the same configuration respectively as the CPU 106, the memory 109, the BT communication I/F 112, the NFC communication I/F 36, the display 102, and the user I/F 104.

The CPU 206 executes a program 220 stored in the memory 209. The memory 209 stores the program 220. The program 220 comprises a wearable application 221, and an operating system 224 (referred to as OS 224 below).

Figure 2:
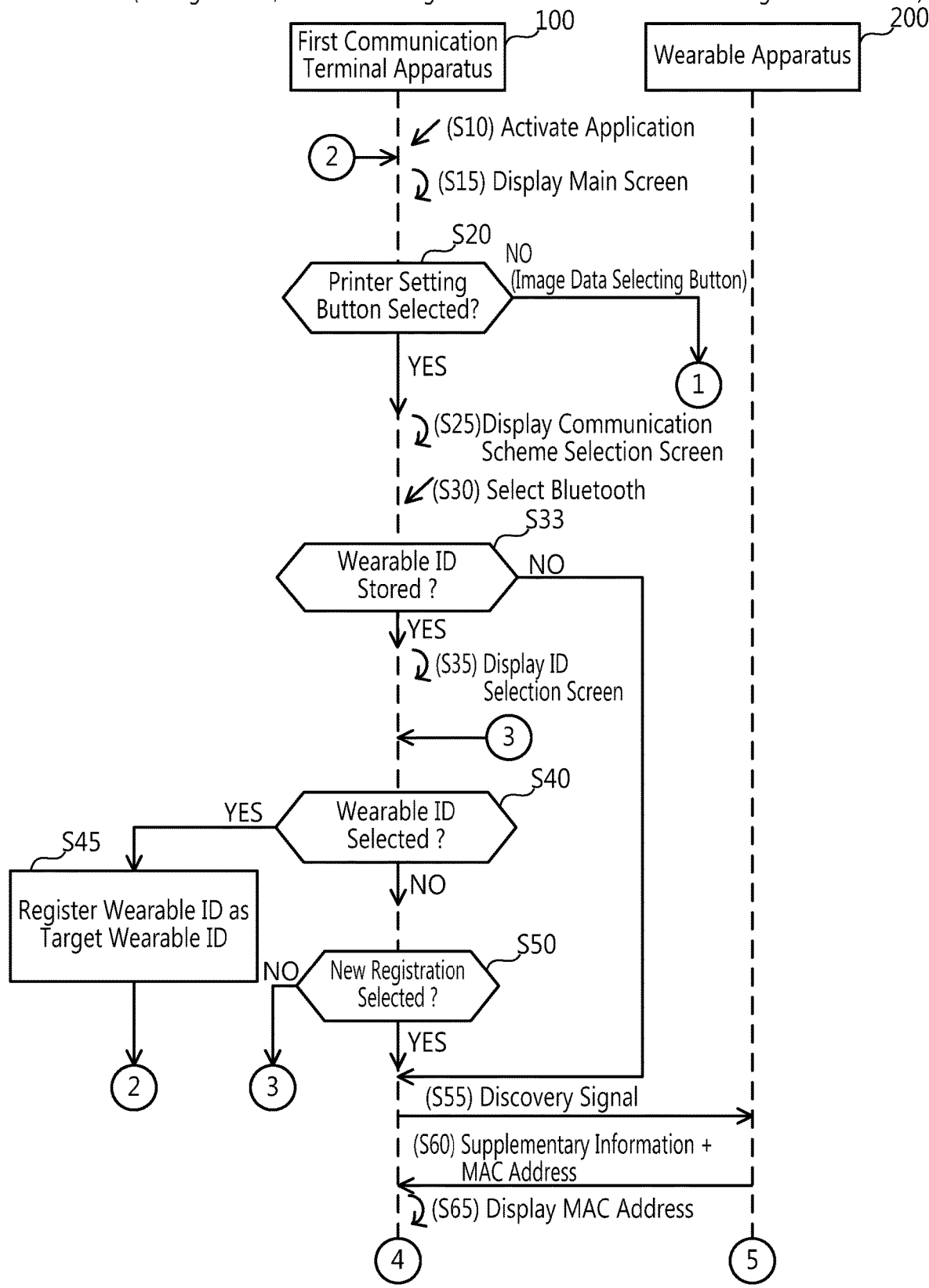
FIG. 2 is a sequence diagram of a pairing process, wearable ID registration process, and terminal ID registration process of first to third embodiments.

A pairing process, a wearable ID registration process, and a terminal ID registration process will be described using FIG. 2. In S10, the CPU 106 of the first communication terminal apparatus 100 activates the terminal application 121 in accordance with a user operation. It should be noted that, below, when describing the execution subject of each process, the CPU 106 of the first communication terminal apparatus 100 operating in accordance with the terminal application 121 may be abbreviated to simply "terminal application 121". Further, the CPU 106 of the first communication terminal apparatus 100 operating in accordance with the OS 124 may be abbreviated to simply "first commumunication terminal apparatus 100". The wearable application 221 and the OS 224 of the wearable apparatus 200 may be referred to in the same manner. The OS 29 of the MFP 51 may be referred to in the same manner.

In S15, the terminal application 121 displays a main screen of the terminal application 121 on the display 102. The main screen includes a printer setting button and an image data selecting button.

In S20, the terminal application 121 determines whether or not it has accepted the user operation of selecting the printer setting button. The first communication terminal apparatus 100 proceeds to S25 in a case of a positive determination in S20 (YES in S20), and proceeds to S310 of FIG. 5 in a case of a negative determination in S20 (NO in S20).

In S25, the terminal application 121 displays a communication scheme selection screen on the display 102. The communication scheme selection screen includes a Bluetooth button and a Wi-Fi button. In the present embodiment, a case will be described in which the terminal application 121 accepted the user operation of selecting the Bluetooth button in S30. Notably, in a case of accepting the user operation of selecting the Wi-Fi button in S30, the terminal application 121 may further accept the user operation of designating an IP address of the MFP, and may store the designated IP address in the memory 109 as an IP address for identifying a target MFP, to be described.

In S33, the terminal application 121 determines whether or not the memory 109 has stored one or more wearable IDs. Each of the one or more wearable IDs includes information for identifying a wearable apparatus, and wearable application identification information for identifying the wearable application 221. The information for identifying a wearable apparatus may be a MAC address of the wearable apparatus. The wearable application identification information may be a URL indicating the wearable application 221. The URL indicating the wearable application 221 will be also referred to as "wearable URL" below. The wearable URL is determined in advance by a manufacturer of the wearable application 221, or by a manufacturer of the OS. Further, the wearable URL can also be said to be information for identifying the manufacturer of the wearable application 221. The memory 109 stores a list of wearable IDs that were registered in the past in the memory 109 by the terminal application 121 by means of the wearable ID registration process, to be described. The terminal application 121 proceeds to S35 in a case of a positive determination in S33 (YES in S33), and proceeds to S55 in a case of a negative determination in S33 (NO in S33).

In S35, the terminal application 121 displays, on the display 102, an ID selection screen that includes buttons corresponding respectively to the one or more wearable IDs stored in the memory 109, and a new registration button.

In S40, the terminal application 121 determines whether or not it has accepted the user operation of selecting the button corresponding to the wearable ID. The first communication terminal apparatus 100 proceeds to S45 in a case of a positive determination in S40 (YES in S40), and proceeds to S50 of in a case of a negative determination in S40 (NO in S40).

In S45, the terminal application 121 stores the wearable ID indicated by the selected button in the memory 109 as a target wearable ID. It should be noted that, below, storing in the memory is also described as registering in the memory. Upon ending S45, the terminal application 121 returns to S15.

In S50, the terminal application 121 determines whether or not it has accepted the user operation of selecting the new registration button. The terminal application 121 proceeds to S55 in a case of a positive determination in S50 (YES in S50), and returns to S40 in a case of a negative determination in S50 (NO in S50). Notably, the ID selection screen may further include a button corresponding to the MFP. In a case of accepting the user operation of selecting the button corresponding to the MFP, the terminal application 121 may store, in the memory 109, a BT address of the MFP indicated by the button as a BT address identifying the target MFP, to be described. The BT address is a MAC address used in the BT communication.

In S55, the terminal application 121 sends a discovery signal in accordance with the Bluetooth standard. Each of wearable apparatuses that have received the discovery signal returns supplementary information and a MAC address. Notably, there exist wearable apparatuses that do not return the supplementary information. In S60, the terminal application 121 receives the supplementary information and the MAC addresses from the wearable apparatuses via the BT communication I/F 112. The supplementary information may include information predetermined by manufacturers of the wearable apparatuses. That is, the supplementary information can also be said to be information indicating the manufacturers of the wearable apparatuses. The supplementary information may be information indicating a device name or information indicating a type of wearable apparatus.

In S65, the terminal application 121 displays, on the display 102, buttons corresponding respectively to the one or more MAC addresses received in S60. Each of the buttons may show the corresponding supplementary information, or the MAC address. The terminal application 121 may not display a corresponding button for a wearable apparatus only the MAC address of which could be received. Further, the terminal application 121 may not display a corresponding button for a wearable apparatus the received supplementary information of which does not indicate the manufacturer of the terminal application 121.

Figure 3:
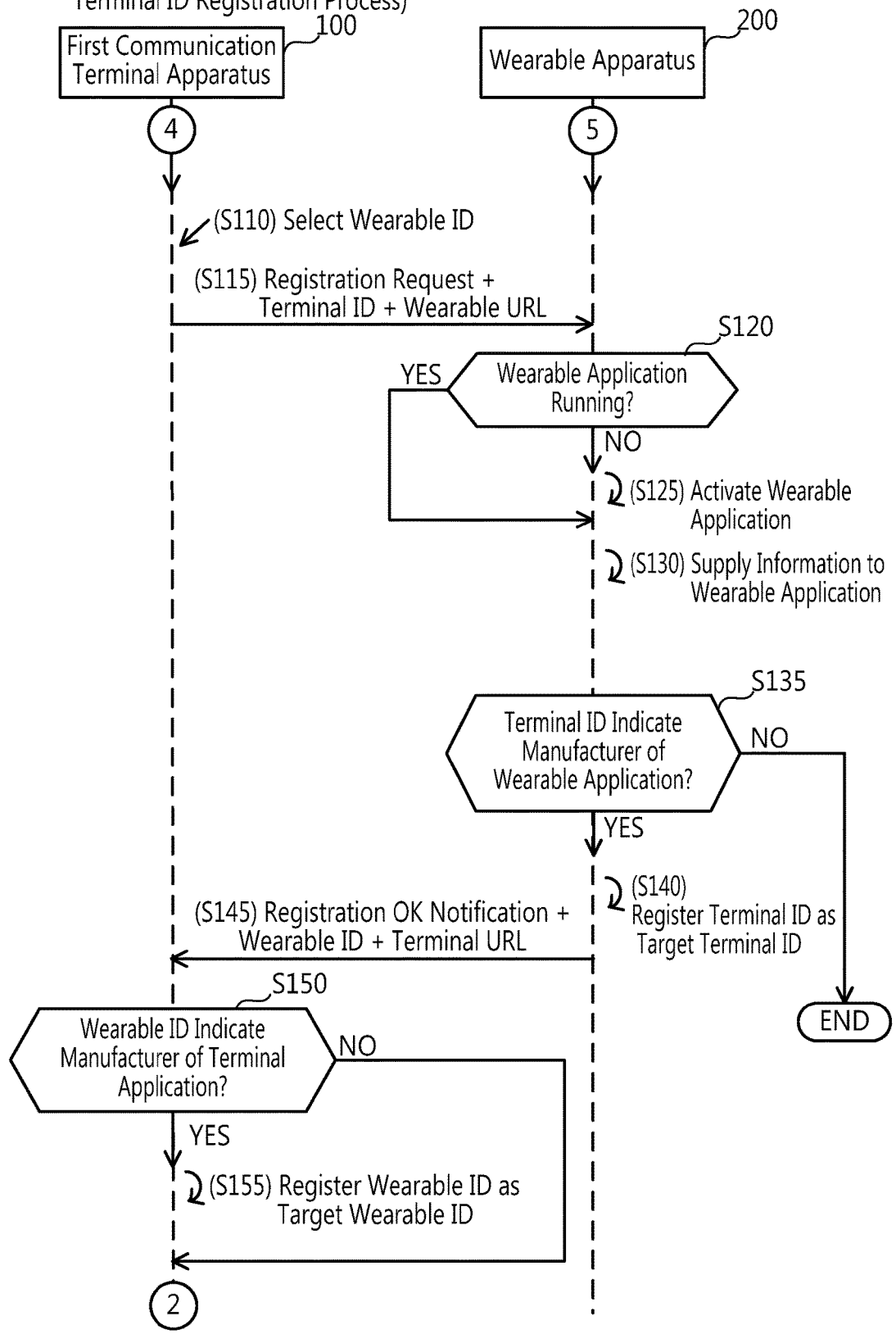
FIG. 3 is a sequence diagram of a continuation of FIG. 2.

In S110 of FIG. 3, the terminal application 121 accepts the user operation of selecting any of the buttons. Hereafter, in the present embodiment, a case will be described in which the button corresponding to the wearable apparatus 200 was selected.

In S115, the terminal application 121 inputs, to the OS 124, the MAC address corresponding to the selected button. The OS 124 stores, in the memory 109, the inputted MAC address as pairing information for identifying a Bluetooth terminal that has been already paired, and sends pairing instruction information to the wearable apparatus 200. The OS 224 which received the pairing instruction information stores the MAC address of the first communication terminal apparatus 100 as pairing information in the memory 209. By means of the BT communication 135, the terminal application 121 sends, via the OS 124, a registration request, a terminal ID, and the wearable URL indicating the wearable application 221, to the wearable apparatus 200 identified by the MAC address corresponding to the selected button. The wearable application 221 receives the registration request, the terminal ID, and the wearable URL from the first communication terminal apparatus 100 via the BT communication I/F 225. The terminal ID includes information for identifying the first communication terminal apparatus 100, and terminal application identification information indicating the terminal application 121 itself. The information for identifying the communication terminal apparatus may be a MAC address of the communication terminal apparatus. The terminal application identification information may be a URL. The URL that indicates the terminal application 121 will be also referred to as "terminal URL" hereafter. The terminal URL is determined in advance by the manufacturer of the terminal application 121, or the manufacturer of the OS. Further, the terminal URL can also be said to be information for identifying the manufacturer of the terminal application 121. Further, the terminal ID is adapted to a specific format decided by the manufacturer of the terminal application 121. Therefore, the entire terminal ID can also be said to be the information for identifying the manufacturer of the terminal application 121.

In S120, the wearable apparatus 200 determines whether or not the wearable application 221 indicated by the wearable URL received in S115 is running. The wearable apparatus 200 proceeds to S130 in a case of a positive determination in S120 (YES in S120), and proceeds to S125 in a case of a negative determination in S120 (NO in S120).

In S125, the wearable apparatus 200 activates the wearable application 221 and, in S130, supplies the information received in S115 to the wearable application 221. Further, in a case where the wearable application 221 has not been installed in the wearable apparatus 200, the wearable apparatus 200 accesses a server storing the wearable application 221, and executes a process for installing the wearable application 221. Notably, the wearable apparatus 200 executes the processes of S120 to S130 in accordance with the OS 224.

In S135, the wearable application 221 determines whether or not the terminal ID received in S115 includes a terminal URL indicating the manufacturer of the wearable application 221. The wearable application 221 proceeds to S140 in a case of a positive determination in S135 (YES in S135), and ends the process of FIG. 3 in a case of a negative determination in S135 (NO in S135).

In S140, the wearable application 221 stores the received terminal ID in the memory 209 as a target terminal ID. In S145, the wearable application 221 sends a registration OK notification, the wearable ID, and the terminal URL to the first communication terminal apparatus 100. The terminal application 121 receives the registration OK notification, the wearable ID, and the terminal URL from the wearable apparatus 200.

In S150, the terminal application 121 determines whether or not the wearable ID received in S145 includes a wearable URL indicating the manufacturer of the terminal application 121 itself. The terminal application 121 proceeds to S155 in a case of a positive determination in S150 (YES in S150), and returns to S15 of FIG. 2 in a case of a negative determination in S150 (NO in S150). The terminal application 121 also returns to S15 of FIG. 2 in a case where the registration OK notification, etc. could not be received even after waiting for a predetermined period after S115.

In S155, the terminal application 121 stores the received wearable ID in the memory 109 as the target wearable ID.

Figure 4:
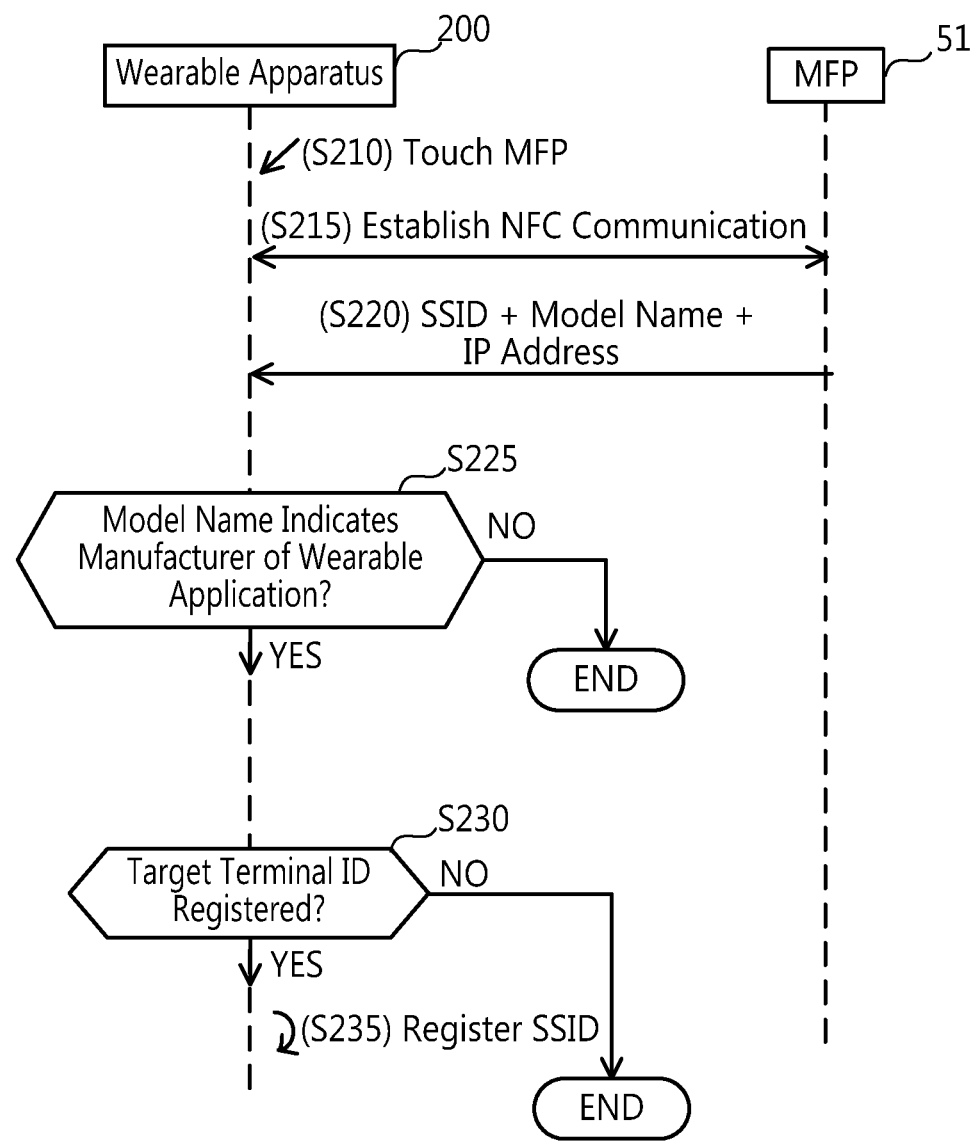
FIG. 4 is a sequence diagram of an SSID receiving process of the first embodiment.

An SSID receiving process will be described using FIGS. 4 to 6. FIG. 4 is a flowchart started when the user brings the wearable apparatus 200 into proximity of the MFP 51 (S210). Due to this, in S215, the wearable apparatus 200 and the MFP 51 establish the NFC communication 145 therebetween.

In S220, the wearable application 221 receives from the MFP 51, via the NFC communication 145, an SSID of a WFD network formed by the MFP 51, a model name indicating a manufacturer of the MFP 51, and an IP address for identifying the MFP 51. The SSID and the IP address are examples of connection information. The model name is an example of information for identifying the manufacturer of the MFP.

In S225, the wearable application 221 determines whether or not the manufacturer of the MFP 51 indicated by the model name received in S220 matches the manufacturer of the wearable application 221. The wearable application 221 proceeds to S230 in a case of a positive determination in S225 (YES in S225), and ends the process of FIG. 4 in a case of a negative determination in S225 (NO in S225).

In S230, the wearable application 221 determines whether or not the target terminal ID has been registered. The wearable application 221 proceeds to S235 in a case of a positive determination in S230 (YES in S230), and ends the process of FIG. 4 in case of a negative determination in S230 (NO in S230).

In S235, the wearable application 221 stores the received SSID, model name, and IP address in the memory 209. Upon ending S235, the wearable application 221 ends the process of FIG. 4.

Figure 5:
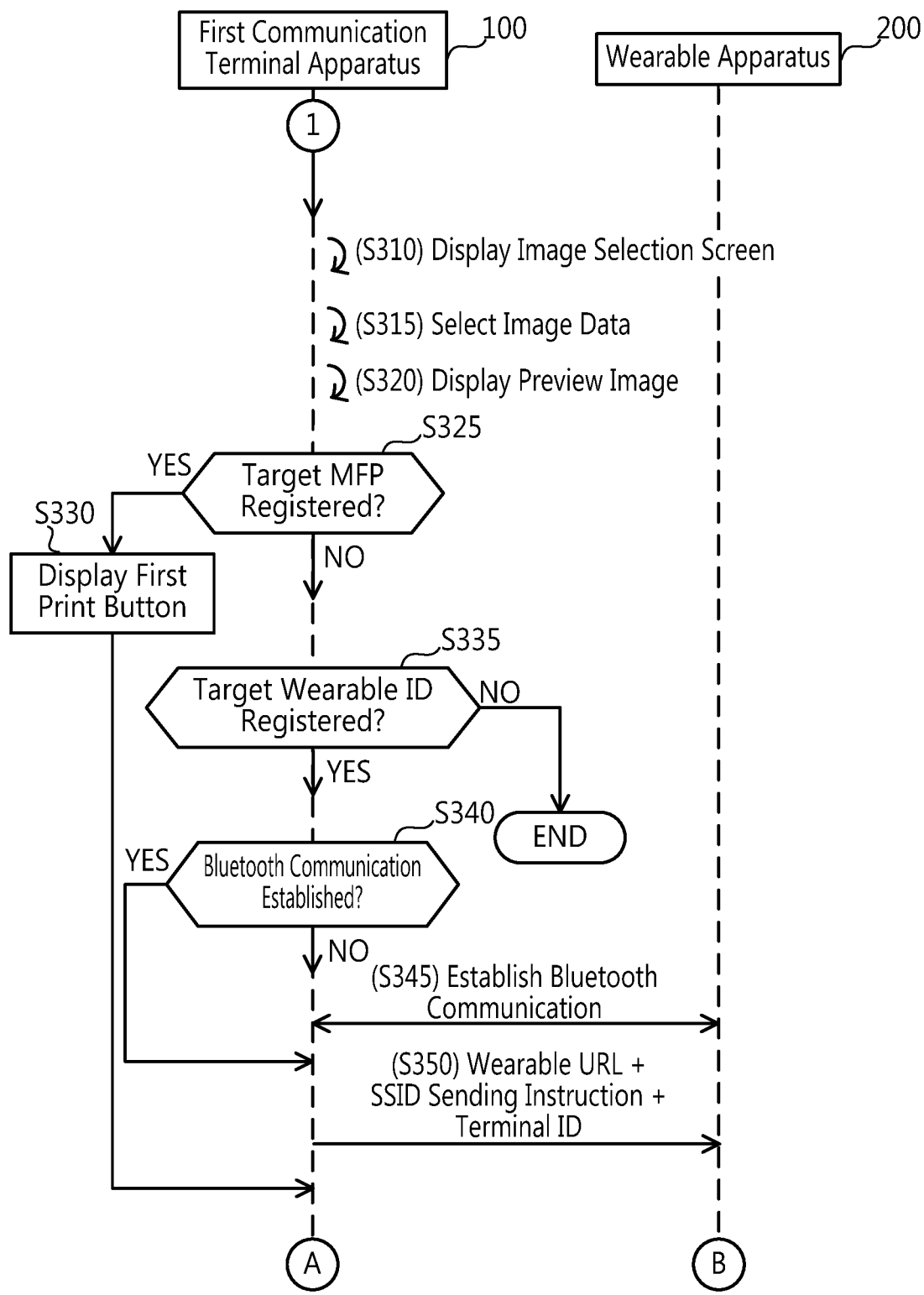
FIG. 5 is a sequence diagram of a continuation of FIG. 4.

In S310 of FIG. 5, in response to accepting the user operation of instructing an image selection screen to be displayed, the terminal application 121 displays, on the display 102, the image selection screen which includes thumbnails corresponding to respective one or more pieces of image data. In S315, the terminal application 121 accepts, via the user I/F 104, the user operation of selecting any of the thumbnails. The user operation for instructing the image selection screen to be displayed, and the user operation of selecting the thumbnail are examples of an operation for instructing the MFP 51 to form an image.

In S320, the terminal application 121 displays, on the display 102, a print preview image of the image data corresponding to the selected thumbnail.

In S325, the terminal application 121 determines whether or not the information for identifying the target MFP is stored in the memory 109. The terminal application 121 proceeds to S330 in a case of a positive determination in S325 (YES in S325), and proceeds to S335 in a case of a negative determination in S325 (NO in S325).

In S330, the terminal application 121 displays a first print button on the display 102.

In S335, the terminal application 121 determines whether or not the target wearable ID is stored in the memory 109. The terminal application 121 proceeds to S340 in a case of a positive determination in S335 (YES in S335), and ends the process of FIG. 5 in a case of a negative determination in S335 (NO in S335). Hereafter, a case will be described in which the wearable ID indicating the wearable apparatus 200 is stored as the target wearable ID.

In S340, the terminal application 121 determines whether or not the BT communication 135 is being established with the wearable apparatus 200. The terminal application 121 proceeds to S350 in a case of a positive determination in S340 (YES in S340), and proceeds to S345 in a case of a negative determination in S340 (NO in S340). In S345, the terminal application 121 establishes the BT communication 135 with the wearable apparatus 200 via the OS 124. For example, in a case where a Bluetooth function of the OS 124 had been turned off, the Bluetooth function is turned on.

In S350, the terminal application 121 sends an SSID sending instruction, the wearable URL, and the terminal ID to the wearable apparatus 200. The wearable application 221 receives the SSID sending instruction, the wearable URL, and the terminal ID from the first communication terminal apparatus 100 via the BT communication I/F 225.

Figure 6:
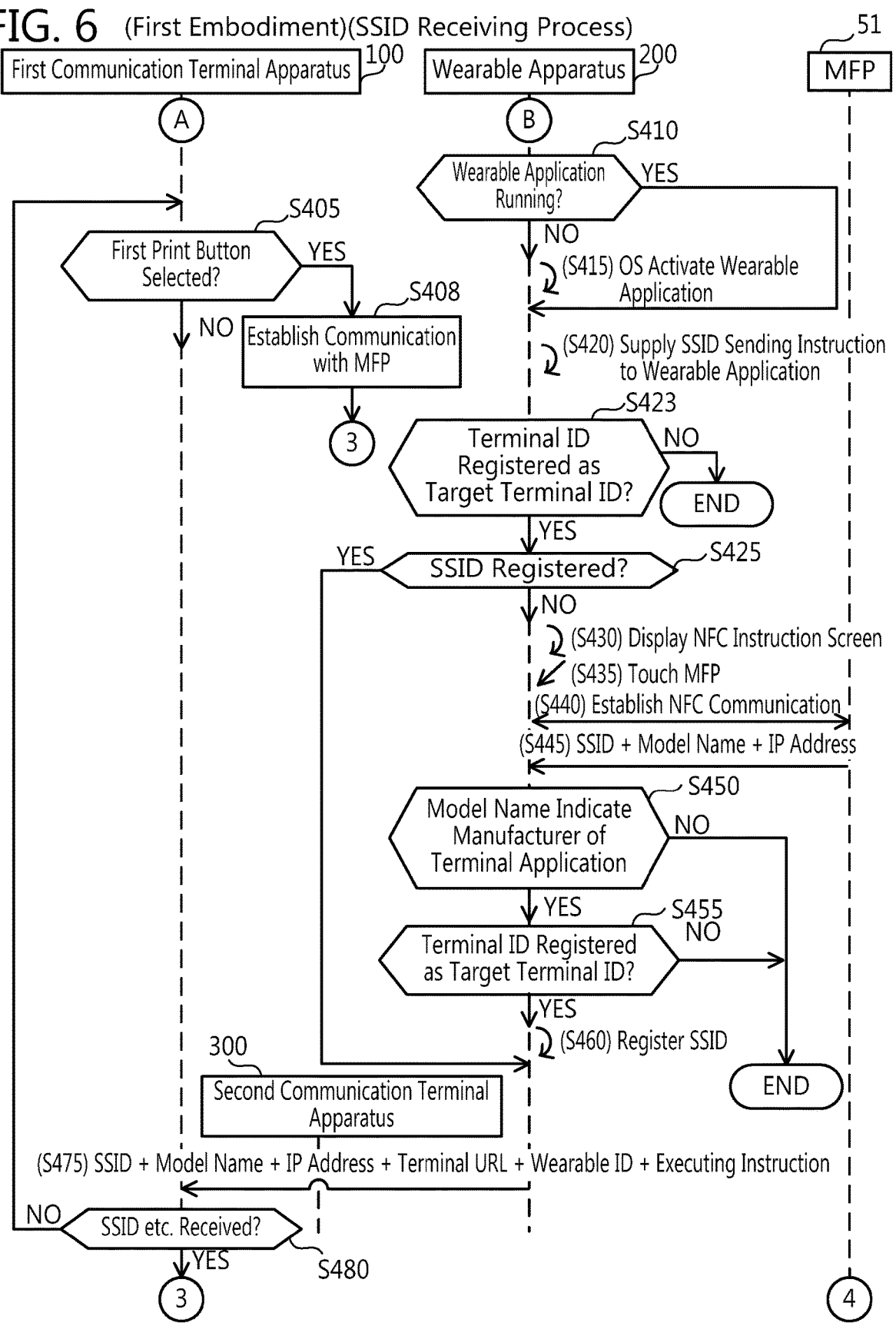
FIG. 6 is a sequence diagram of a continuation of FIG. 5.

In S405 of FIG. 6, the terminal application 121 determines whether or not the first print button has been selected by the user. In a case of a positive determination in S405 (YES in S405), the terminal application 121 establishes a communication with the MFP 51 in S408, and sends the image data to the MFP 51 in S535 of FIG. 7. In a case of a negative determination in S405 (NO in S405), the terminal application 121 proceeds to S475. In a case where the IP address for identifying the target MFP and the SSID are being stored in association with each other in the memory 109, the terminal application 121 may establish the WFD communication 155 in S408. In a case where only the IP address for identifying the target MFP is being stored in the memory 109, the terminal application 121 may not execute S408, and in S535, may send the image data corresponding to the thumbnail selected in S315, and a print instruction of the image data to the target MFP via the WF communication to which the terminal application 121 has already been connected. In a case where the BT address for identifying the target MFP is being stored in the memory 109, in S408, the terminal application 121 may establish a BT communication between the first communication terminal apparatus 100 and the target MFP 51.

In S410 to S420 of FIG. 6, the wearable application 221 executes the same operations as S120 to S130.

In S423, the wearable application 221 determines whether or not a terminal ID matching the terminal ID received in S350 of FIG. 5 is being stored in the memory 209 as the target terminal ID. The wearable application 221 proceeds to S425 in a case of a positive determination in S423 (YES in S423), and ends the process of FIG. 6 in a case of a negative determination in S423 (NO in S423).

In S425, in response to the inclusion of the SSID sending instruction in the information supplied from the OS 224 in S420, the wearable application 221 determines whether or not the SSID, etc. received from the MFP 51 is being stored in the memory 209. The wearable application 221 proceeds to S465 in a case of a positive determination in S425 (YES in S425), and proceeds to S430 in a case of a negative determination in S425 (NO in S425).

In S430, the wearable application 221 displays, on the display 203, an NFC instruction screen which suggests making a distance between the wearable apparatus 200 and the MFP 51 equal to or less than a predetermined short range distance. S435 to S445 are respectively the same as S210 to S220 of FIG. 4.

In S450, the wearable application 221 determines whether or not the manufacturer of the MFP 51 indicated by the model name received in S445 matches the manufacturer of the terminal application 121 indicated by the terminal URL supplied in S420. Notably, in S450, the wearable application 221 may determine whether or not the manufacturer of the MFP 51 matches the manufacturer of the wearable application 221. Both the determinations are substantially the same. The wearable application 221 proceeds to S455 in a case of a positive determination in S450 (YES in S450), and ends the process of FIG. 6 in a case of a negative determination in S450 (NO in S450). S455 to S460 are the same as S230 to S235 of FIG. 4.

In S475, the wearable application 221 sends, via the BT communication I/F 225, the SSID, the model name, the IP address, the terminal URL, the wearable ID, and an executing instruction to the first communication terminal apparatus 100 identified by the terminal ID supplied in S420. The terminal application 121 receives the SSID, etc. from the wearable apparatus 200 via the BT communication I/F 112. S475 is an example of sending connection information, portable-program-identification information, and an executing instruction.

In S480, the terminal application 121 determines whether or not the SSID have been received from the wearable apparatus 200. The terminal application 121 proceeds to S510 of FIG. 7 in a case of a positive determination in S480 (YES in S480), and returns to S405 in a case of a negative determination in S480 (NO in S480).

Figure 7:
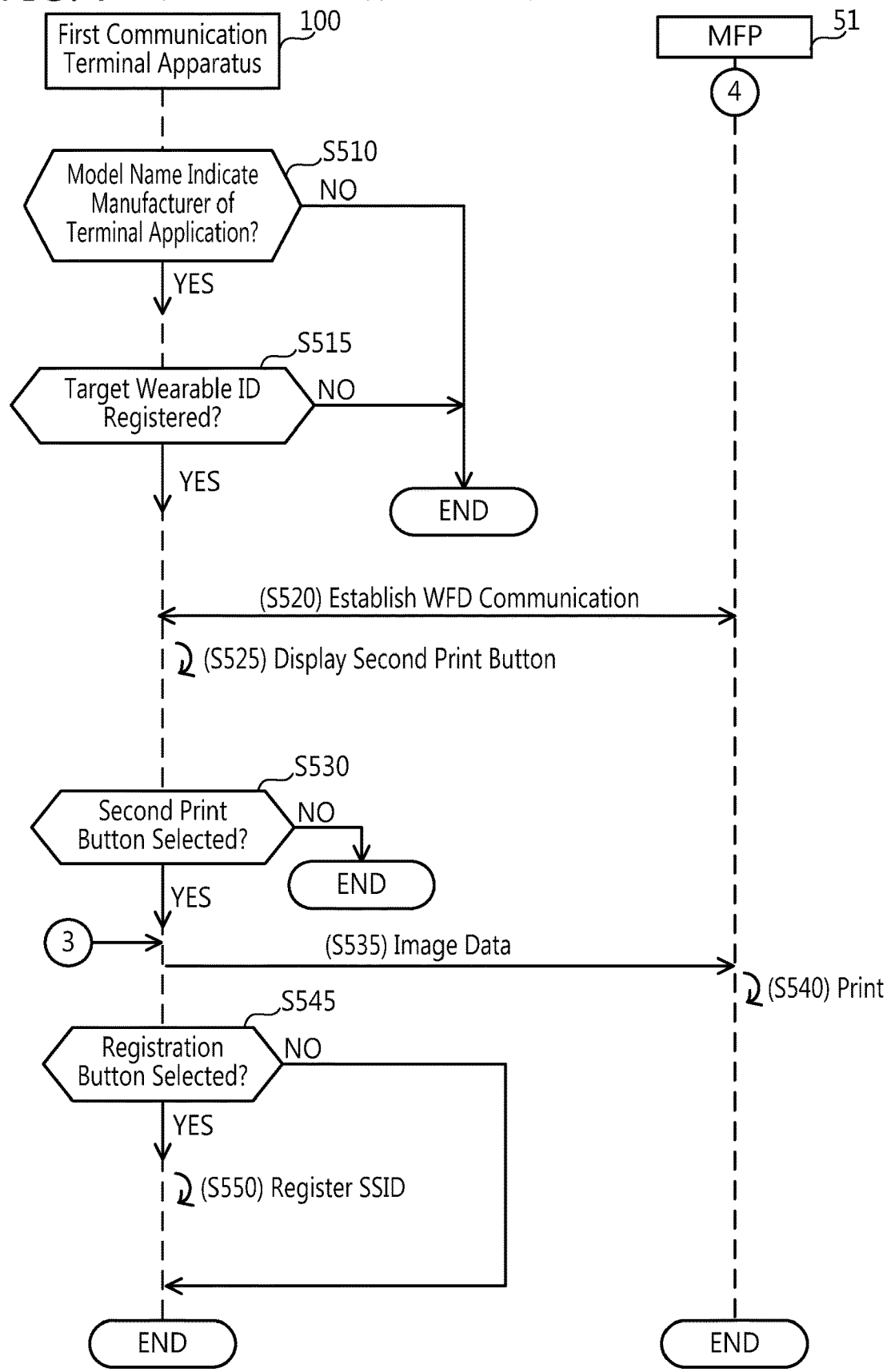
FIG. 7 is a sequence diagram of a print process of the first embodiment.

A print process will be described using FIG. 7. S510 is the same as S450. The terminal application 121 proceeds to S515 in a case of a positive determination in S510 (YES in S510), and ends the process of FIG. 7 in a case of a negative determination in S510 (NO in S510).

In S515, the terminal application 121 determines whether or not the wearable ID received in S475 of FIG. 6 has been registered as the target wearable ID. The terminal application 121 proceeds to S520 in a case of a positive determination in S515 (YES in S515), and ends the process of FIG. 7 in a case of a negative determination in S515 (NO in S515).

In S520, the terminal application 121 causes the wireless LAN I/F 105 to establish the WFD communication 155 with the MFP 51 by using the SSID received from the wearable apparatus 200 indicated by the wearable ID. S520 is an example of causing a second wireless interface to establish a second wireless communication with an image forming apparatus.

In S525, the terminal application 121 displays a second print button on the display 102.

In S530, the terminal application 121 determines whether or not it has accepted the user operation of selecting the second print button. The terminal application 121 proceeds to S535 in a case of a positive determination in S530 (YES in S530), and ends the process of FIG. 7 in a case of a negative determination in S530 (NO in S530).

In S535, the terminal application 121 sends the image data corresponding to the thumbnail selected in S315 and the print instruction of the image data, to the MFP 51 via the communication established in S408 or S520. The image data in S535 is a concept including information (e.g., URL, etc.) that has the MFP 51 download the image data.

In S540, the MFP 51 causes the printer 19 to execute a print of the image represented by the received image data.

In S545, the terminal application 121 determines whether or not it has accepted a selection of a registration button via the user I/F 104. The terminal application 121 proceeds to S550 in a case of a positive determination in S545 (YES in S545), and ends the process of FIG. 7 in a case of a negative determination in S545 (NO in S545). In S550, the terminal application 121 stores, in the memory 109, the SSID, the model name, and the IP address received from the wearable apparatus 200 in association with one another.

Effect of First Embodiment

In the first embodiment, the first communication terminal apparatus 100 does not comprise an NFC communication I/F. Here, by using the wearable apparatus 200, the user of the first communication terminal apparatus 100 can instruct the MFP 51 to print.

By bringing the wearable apparatus 200 that has registered the terminal application 121 close to the MFP 51, the user of the first communication terminal apparatus 100 can instruct the MFP 51 to print.

The user of the first communication terminal apparatus 100 can instruct the MFP 51 to print by using the wearable application 221 provided by the manufacturer of the terminal application 121.

The user of the first communication terminal apparatus 100 can instruct the MFP 51 to print by using the wearable application 221 provided by the manufacturer of the MFP 51.

The user of the first communication terminal apparatus 100 can control a timing of the print instruction to the MFP 51 to which the wearable apparatus 200 has been brought close, at a first communication terminal apparatus 100 side.

The user of the first communication terminal apparatus 100 can control, after bringing the wearable apparatus 200 close to the MFP 51, the timing of the print instruction at the first communication terminal apparatus 100 side.

Even in a case where the first communication terminal apparatus 100 sends the SSID sending instruction when the wearable apparatus 200 is not yet brought close to the MFP 51, the user of the first communication terminal apparatus 100 can understand that the wearable apparatus 200 should be brought close to the MFP 51 and then the print instruction should be given to the MFP 51.

Here, the user of the first communication terminal apparatus 100 can instruct the MFP 51 to print via the wearable apparatus 200 that has been brought close to the MFP 51 by instructing the terminal application 121 to select an image and use the wearable apparatus 200.

The user of the first communication terminal apparatus 100 can instruct the MFP 51 to print by bringing the wearable apparatus 200 which has been resistered in the terminal application 121 close to the MFP 51.

The user of the first communication terminal apparatus 100 can give the print instruction to the MFP 51, to which the wearable apparatus 200 has been brought close, at a timing after confirmation of contents of the image to be printed.

Even when the wearable application 221 has not been activated in advance, the user of the first communication terminal apparatus 100 can instruct the MFP 51 to print from the first communication terminal apparatus 100 via the wearable application 221.

Once the user of the first communication terminal apparatus 100 has instructed the MFP 51 via the wearable apparatus 200 to print, the user of the first communication terminal apparatus 100 can become able to give the print instruction, not via the wearable apparatus 200, from the first communication terminal apparatus 100 to the MFP 51 thereafter.

Second Embodiment

An SSID receiving process of a second embodiment will be described using FIGS. 8, 9. S610, S615 are respectively the same as S210, S215 of FIG. 4.

In S620, the wearable application 221 receives the terminal URL, the SSID, the model name, and the IP address from the MFP 51 via the NFC communication 145. In S625 to S650 of FIG. 6, the wearable application 221 performs the same operations as S120 to S130 of FIG. 3, and S450 to S460 of FIG. 6.

In S655, the wearable application 221 determines whether or not a plurality of apparatus IDs is stored in the memory 209. The wearable application 221 proceeds to S660 in a case of a positive determination in S655 (YES in S655), and proceeds to S670 in a case of a negative determination in S655 (NO in S655).

In S660, the wearable application 221 displays, on the display 203, the ID selection screen including the plurality of apparatus IDs that have been stored. In S665, the wearable application 221 accepts the user operation of selecting the terminal ID of the MFP 51 from among the one or more apparatus IDs.

In S670, the wearable application 221 sends the SSID, the model name, the IP address, the terminal URL, the wearable ID, and the executing instruction, via the BT communication I/F 225, to the first communication terminal apparatus 100 identified by the terminal ID.

Figure 8:
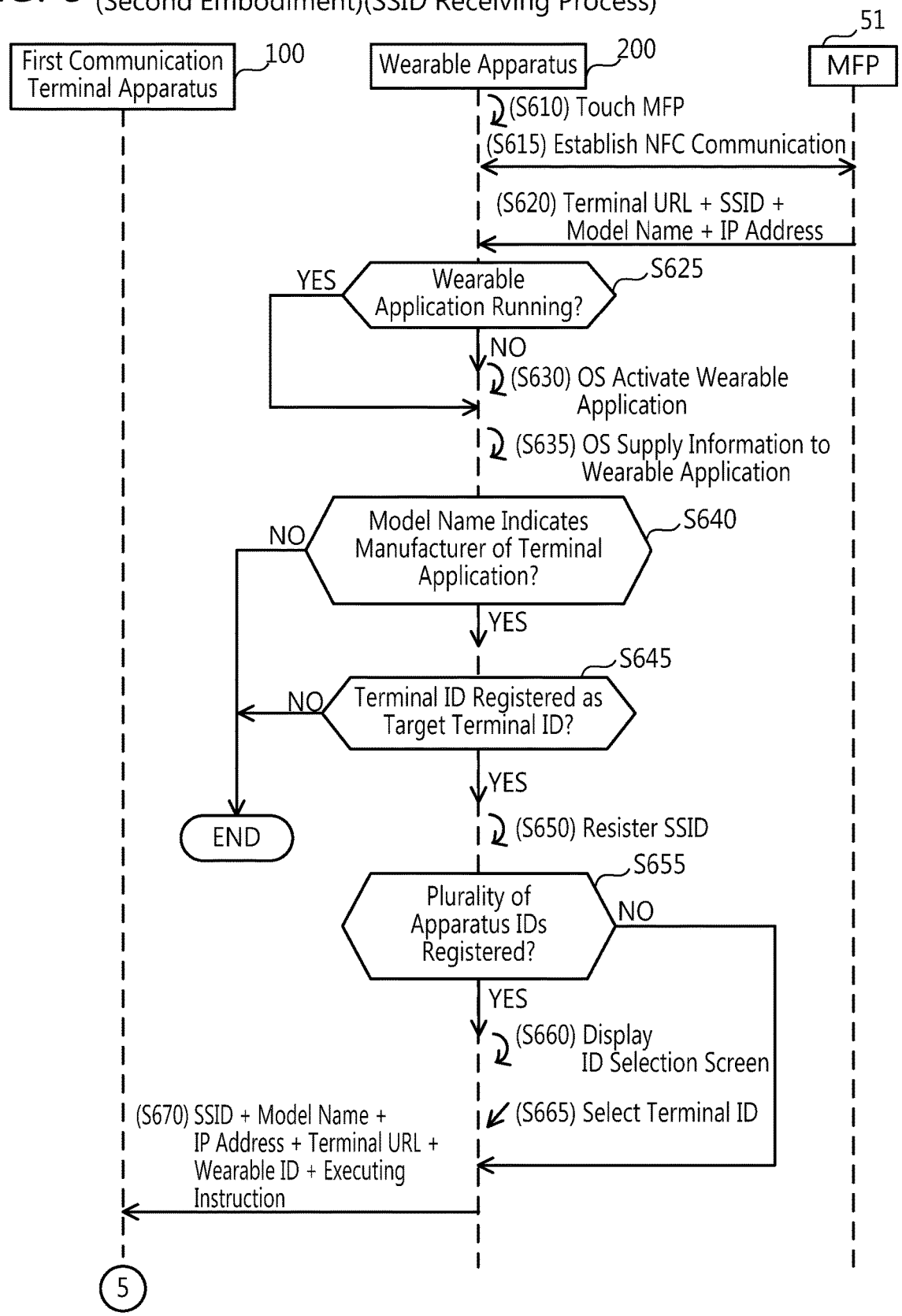
FIG. 8 is a sequence diagram of an SSID receiving process of the second embodiment.
Figure 9:
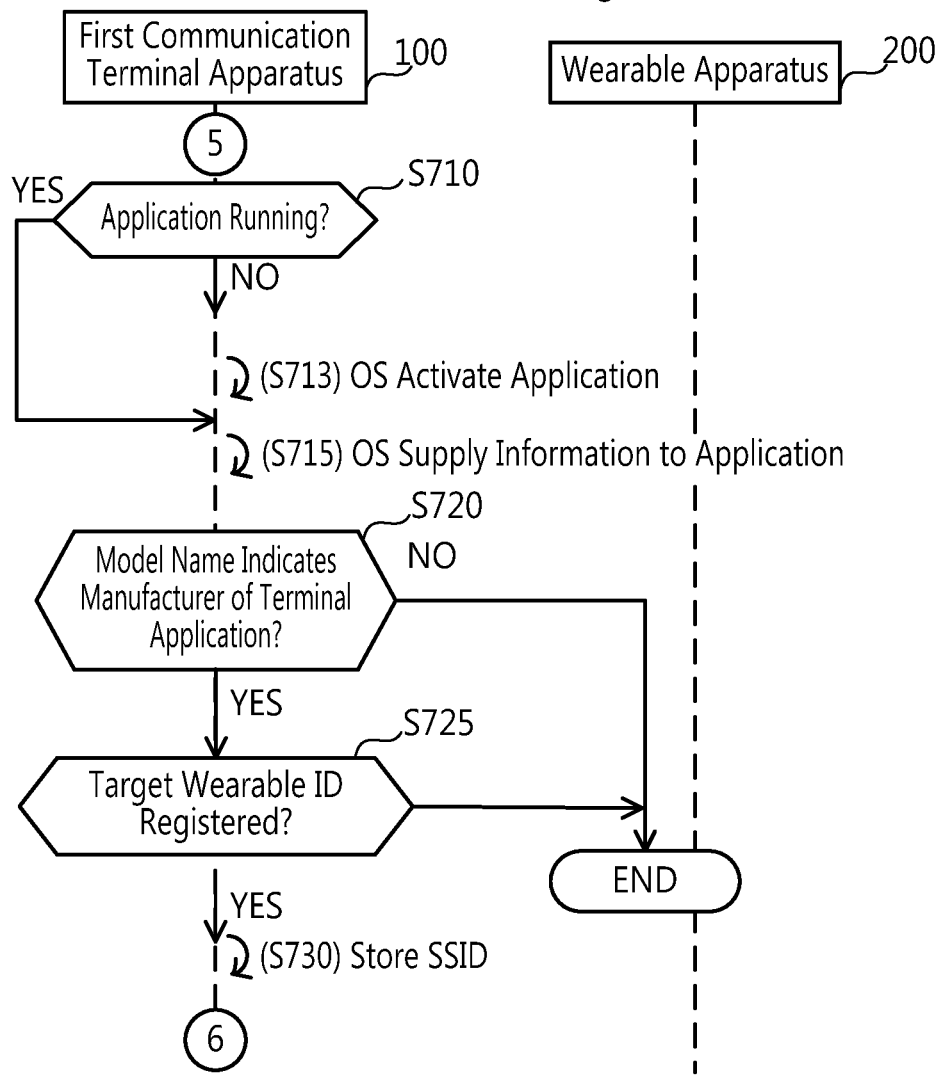
FIG. 9 is a sequence diagram of a continuation of FIG. 8.

In S710 of FIG. 9, the first communication terminal apparatus 100 determines whether or not the terminal application 121 indicated by the terminal URL received in S670 of FIG. 8 is running. The first communication terminal apparatus 100 proceeds to S715 in a case of a positive determination in S710 (YES in S710), and proceeds to S713 in a case of a negative determination in S710 (NO in S710).

In S713, the first communication terminal apparatus 100 activates the terminal application 121 and, in S715, supplies the information received in S670 of FIG. 8 to the terminal application 121. S720, S725 are the same as S510, S515 of FIG. 7.

In S730, the terminal application 121 stores the SSID, the model name, and the IP address.

Figure 10:
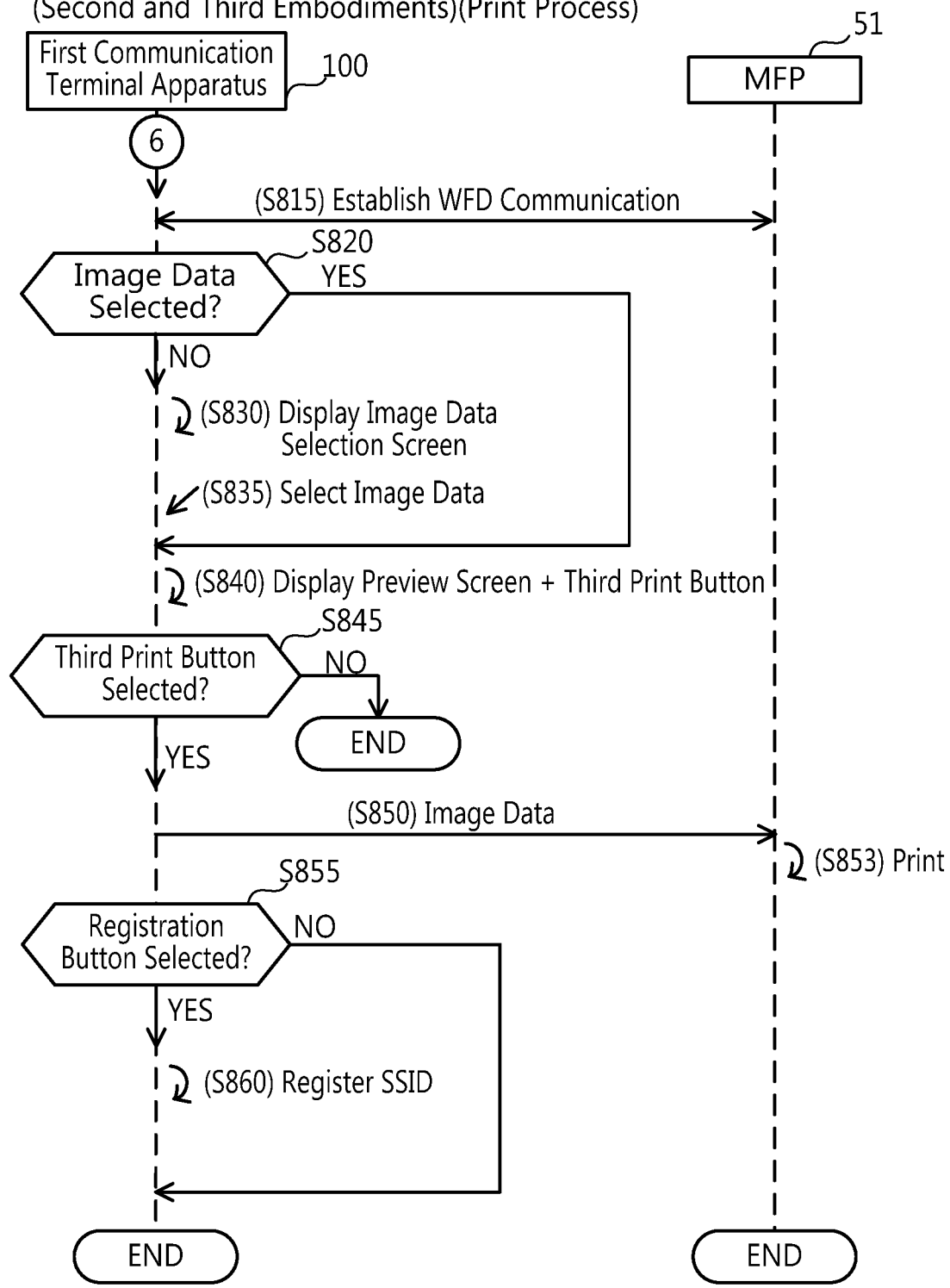
FIG. 10 is a sequence diagram of a print process of the second and third embodiments.

A print process of the second embodiment will be described using FIG. 10. S815 is the same as S520 of FIG. 7. In S820, the terminal application 121 determines whether or not image data has been selected. The terminal application 121 proceeds to S840 in a case of a positive determination in S820 (YES in S820), and proceeds to S830 in a case of a negative determination in S820 (NO in S820). S830, S835 are respectively the same as S310, S315 of FIG. 5.

In S840, the terminal application 121 displays, on the display 203, a preview image of the selected image data, and a third print button.

In S845, the terminal application 121 determines whether or not the third print button has been selected. The terminal application 121 proceeds to S850 in a case of a positive determination in S845 (YES in S845), and ends the process of FIG. 10 in a case of a negative determination in S845 (NO in S845). S850 to S860 are the same as S535 to S550 of FIG. 7.

Effect of Second Embodiment

The user of the first communication terminal apparatus 100 can give the print instruction to the MFP 51 by selecting an image in the terminal application 121 after bringing the wearable apparatus 200 close to the MFP 51.

Even when the terminal application 121 has not been activated in advance, the user of the first communication terminal apparatus 100 can instruct the MFP 51 to print from the first communication terminal apparatus 100 via the wearable apparatus 200.

Third Embodiment

Figure 11:
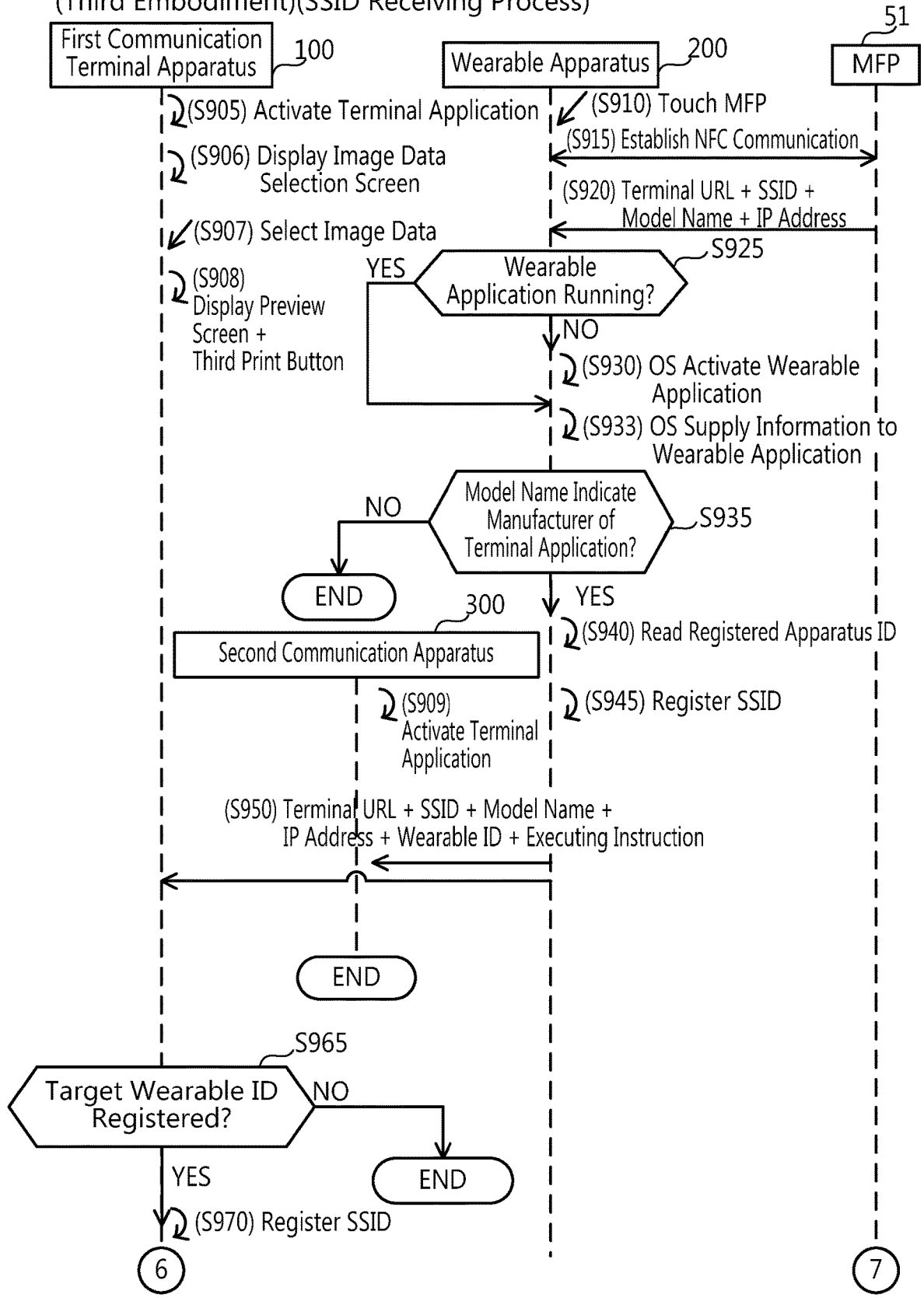
FIG. 11 is a sequence diagram of an SSID receiving process of the third embodiment.

An SSID receiving process of the third embodiment will be described using FIG. 11. In S905, the first communication terminal apparatus 100 activates the terminal application 121 via an operation by the user. S906, S907, S908 are the same as S830, S835, S840. In S909, the second communication terminal apparatus 300 has the terminal application 121 running via an operation by the user, but has not selected image data. S910 to S935 are respectively the same as S610 to S640 of FIG. 8. Notably, the terminal application 121 is programmed so as to become in a state of being able to execute the process of S965 and the subsequent processes by executing S908.

In S940, the wearable application 221 reads out the one or more registered apparatus IDs. The one or more registered apparatus IDs include the terminal ID and an ID of the second communication terminal apparatus 300. S945 is the same as S460 of FIG. 6.

In S950, the wearable application 221 sends, via the BT communication I/F 225, the terminal URL, the SSID, the model name, the IP address, the wearable ID, and the executing instruction to one or more apparatuses (i.e., the communication terminal apparatuses 100, 300) identified by the one or more apparatus IDs.

Since the image data has been selected in the case of the first communication terminal apparatus 100, the first communication terminal apparatus 100 executes S965, S970. Since the image data has not been selected in the case of the second communication terminal apparatus 300, the second communication terminal apparatus 300 does not execute S965, S970. S965, S970 are respectively the same as S515, S550 of FIG. 7. Notably, each of the first communication terminal apparatus 100 and the second communication terminal apparatus 300 which have received the information sent in S950 may have a configuration that determines whether or not the image data has been selected and, in a case where the image data has been selected, executes S965, S970.

Effect of Third Embodiment

By selecting an image in only the terminal application 121 of the first communication terminal apparatus 100, and then bringing the wearable apparatus 200 close to the MFP 51, the user of the first communication terminal apparatus 100 and the second communication terminal apparatus 300 can give the print instruction to the MFP 51 from only the first communication terminal apparatus 100 without performing any other extra operation.

(Modifications)

"Connection information" is not limited to the SSID of the WFD network, but may be an SSID of a network formed by an access point. Further, "second wireless communication" may be a Wi-Fi communication via an access point.

"Image forming apparatus" is not limited to the MFP 51, but may be a so-called single function printer, etc. that does not comprise a scanner. Furthermore, the "image forming apparatus" may be any apparatus capable of executing an image forming process regardless of whether an image to be formed is planar or three dimensional. For example, the "image forming apparatus" may be a sewing machine, embroidery machine, molding apparatus, 3D printer, label writer or garment printer.

Instead of the wireless LAN I/F 34, the MFP 51 may comprise a BT communication I/F. In this case, the "connection information" may be setting information (apparatus ID of a communication destination, etc.) of a BT communication, and the "second wireless communication" may be a BT communication.

"Short range communication interface" is not limited to the NFC communication I/F 226, but may be, for example, a TJ communication I/F, etc. which performs a wireless communication conforming to TransferJet (registered trademark of Sony Corporation) standard.

The NFC communication, the BT communication, and the WFD communication are an example of a short range wireless communication, a first wireless communication, and a second wireless communication, respectively. The NFC communication I/F 226 and the BT communication I/F 225 are an example of a short range communication interface and a wireless interface, respectively. The first communication terminal apparatus 100, the wearable apparatus 200, and the MFP 51 are an example of a portable apparatus, a short range communication apparatus, and an image forming apparatus, respectively. The SSID and the SSID sending instruction are an example of connection information and a sending instruction, respectively. The terminal application 121, the terminal URL, the terminal ID, and the wearable URL are an example of a portable program, portable program identification information, portable-apparatus-identification information, and portable-program-manufacturer-identification information, respectively. The NFC instruction screen is an example of a first screen. S220 of FIG. 4, S445 of FIG. 6, S620 of FIG. 8, and S920 of FIG. 11 are examples of receiving connection information from an image forming apparatus. S115 of FIG. 3 is an example of receiving portable-apparatus-identification information. S235 of FIG. 4 and S460 of FIG. 6 are examples of storing the received connection information. S475 of FIG. 6, S670 of FIG. 8 and S950 of FIG. 11 are examples of sending the connection information, portable-program-identification information and an executing instruction. S140 of FIG. 3 is an example of storing the received portable-apparatus-identification information. S423 of FIG. 6 and S645 of FIG. 8 are examples of determining whether or not the portable-apparatus-identification information is stored. S135 of FIG. 3 is an example of determining whether or not the received portable-apparatus-identification information includes short-range-program-manufacturer-identification information. S450 of FIG. 6, S640 of FIG. 8, and S935 of FIG. 11 are examples of determining whether or not portable-program-manufacturer-identification information has been received together with the connection information. S425 of FIG. 6 is an example of determining whether the connection information is stored or not. S350 of FIG. 5 is an example of receiving a sending instruction. S430 of FIG. 6 is an example of causing a display of the short range communication apparatus to display a first screen.

The BT communication I/F 112 and the wireless LAN I/F 105 are examples of a first wireless interface and a second wireless interface, respectively. The operation of S315 of FIG. 5, and the operation of S40 of FIG. 2 are an example of a first operation and a second operation, respectively. The wearable ID and the first print button are an example of short-range-communication-apparatus-identification information and a print object, respectively. S475 of FIG. 6 is an example of receiving the connection information from the short range communication apparatus. S520 of FIG. 7 and S815 of FIG. 10 are examples of causing the second wireless interface to establish the second wireless communication. S535 of FIG. 7 and S850 of FIG. 10 are examples of instructing the image forming apparatus to form the image. S60 of FIG. 2 is an example of receiving, via the first wireless interface, short-range-communication-apparatus-identification information. S155 of FIG. 3 and S550 of FIG. 7 are an example of storing the received short-range-communication-apparatus-identification information and storing the received connection information, respectively. S335 of FIG. 5, S150 of FIG. 3, S510 of FIG. 7, and S325 of FIG. 5 are an example of determining whether the short-range-communication-apparatus-identification information is stored in the memory or not, determining whether or not the received short-range-communication-apparatus-identification information includes portable-program-maker-identification information, determining whether or not portable-program-manufacturer-identification information has been received together with the connection information, and determining whether the connection information has been stored or not, respectively. S350 of FIG. 5 is an example of sending a sending instruction. S320 of FIG. 5, and S330 of FIG. 5 are an example of causing a display of the portable apparatus to display a preview image of image data and causing a display of the portable apparatus to display a print object, respectively.

What is claimed is:

1. A non-transitory computer-readable storage medium storing computer-readable instructions for a short range communication apparatus, wherein the short range communication apparatus comprises:
    a memory;
    a short range communication interface configured to execute a short range wireless communication with an image forming apparatus that is different from the short range communication apparatus, the short range wireless communication being established by a trigger that a distance between the short range communication interface and the image forming apparatus becomes equal to or less than a short range distance; and
    a wireless interface configured to execute a first wireless communication with a portable apparatus that is different from the short range communication apparatus and the image forming apparatus, the first wireless communication having a longer communication distance than the short range wireless communication, the first wireless communication conforming to a wireless communication standard which is different from a short range communication standard to which the short range wireless communication conforms, a registration process being performed in the first wireless communication, and short-range-communication-apparatus-identification information of a short range communication apparatus being stored in a portable apparatus in the registration process,
    the computer-readable instructions, when executed by a processor of the short range communication apparatus, cause the short range communication apparatus to perform:
        establishing the first wireless communication between the wireless interface of the short range communication apparatus and the portable apparatus;
        receiving a registration request from the portable apparatus when the first wireless communication is established with the portable apparatus in which the short-range-communication-apparatus-identification information has not been stored yet;
        sending the short-range-communication-apparatus-identification information to the portable apparatus that has sent the registration request, such that the sent short-range-communication-apparatus-identification information is stored in the portable apparatus;
        establishing the short range wireless communication between the short range communication interface of the short range communication apparatus and the image forming apparatus; and
        after the short range wireless communication has been established, communicating connection information with the image forming apparatus via the short range wireless communication, wherein the connection information is necessary information for the portable apparatus to execute a second wireless communication with the image forming apparatus without intermediation of the short range communication apparatus,
    after the connection information has been communicated, the computer-readable instructions cause the short range communication apparatus to further perform sending an executing instruction, the communicated connection information and the short-range-communication-apparatus-identification information to the portable apparatus via the first wireless communication,
    wherein when it is determined in the portable apparatus that the sending of the executing instruction, the communicated connection information and the short-range-communication-apparatus-identification information is performed by the registered short range communication apparatus by using the sent short-range-communication-apparatus-identification information, the executing instruction causing the portable apparatus to establish the second wireless communication between the portable apparatus and the image forming apparatus without intermediation of the short range communication apparatus using the connection information,
    wherein when it is determined in the portable apparatus that the sending of the executing instruction, the communicated connection information and the short-range-communication-apparatus-identification information is not performed by the registered short range communication apparatus by using the sent short-range-communication-apparatus-identification information, the executing instruction does not cause the portable apparatus to establish the second wireless communication,
    the portable apparatus is an apparatus capable of executing a portable program for instructing the image forming apparatus to form an image via the second wireless communication, and
    the second wireless communication has a longer communication distance than the short range wireless communication.

2. The non-transitory computer-readable storage medium as in claim 1, wherein
    the computer-readable instructions cause the short range communication apparatus to further perform:
    receiving portable-apparatus-identification information from the portable apparatus via the wireless interface; and
    storing the received portable-apparatus-identification information in the memory; and
    determining whether or not the portable-apparatus-identification information is stored in the memory; and
    wherein
    the portable-apparatus-identification information is information for identifying the portable apparatus, and
    the executing instruction is sent via the wireless interface to the portable apparatus that is identified by the portable-apparatus-identification information in response to the determining that the portable-apparatus-identification information is stored in the memory.

3. The non-transitory computer-readable storage medium as in claim 2, wherein the
    computer-readable instructions cause the short range communication apparatus to further perform
    determining whether or not the received portable-apparatus-identification information includes short-range-program-manufacturer-identification information indicating a manufacturer of the non-transitory computer-readable storage medium, and the portable-apparatus-identification information is stored in the memory in response to the determining that the portable-apparatus-identification information includes the short-range-program-manufacturer-identification information.

4. The non-transitory computer-readable storage medium as in claim 1, wherein the computer-readable instructions cause the short range communication apparatus to further perform determining whether or not portable-program-manufacturer-identification information indicating a manufacturer of the portable program has been received together with the connection information received from the image forming apparatus via the short range wireless communication, wherein the executing instruction is sent via the wireless interface to the portable apparatus in response to the determining that the portable-program-manufacturer-identification information has been received.

5. The non-transitory computer-readable storage medium as in claim 1, wherein the computer-readable instructions cause the short range communication apparatus to further perform:

receiving portable-apparatus-identification information for identifying the portable apparatus from the portable apparatus via the wireless interface;

storing the received portable-apparatus-identification information in the memory;

receiving, from the portable apparatus via the wireless interface, a sending instruction for instructing sending of the connection information; and determining, based on the portable-apparatus-identification information, whether or not the sending instruction has been received from the portable apparatus that is identified by the portable-apparatus-identification information stored in the memory, and the executing instruction is sent to the portable apparatus via the wireless interface in response to the receiving of the connection information from the image forming apparatus via the short range wireless communication and the determining that the sending instruction has been received from the portable apparatus identified by the portable-apparatus-identification information.

6. The non-transitory computer-readable storage medium as in claim 5, wherein the computer-readable instructions cause the short range communication apparatus to further perform determining whether or not the connection information is stored in the memory or not in response to the receiving of the sending instruction from the portable apparatus, and in a case where it is determined that the connection information is stored in the memory, the connection information that is stored in the memory and the executing instruction are sent to the portable apparatus via the wireless interface.

7. The non-transitory computer-readable storage medium as in claim 6, wherein the computer-readable instructions cause the short range communication apparatus to further perform in response to the determining that the connection information is not stored in the memory, causing a display of the short range communication apparatus to display a first screen suggesting making a distance between the short range communication apparatus and the image forming apparatus equal to or less than the short range distance, and the connection information is received from the image forming apparatus via the short range communication interface in response to the short range wireless communication being established after the first screen has been displayed.

8. A non-transitory computer-readable storage medium storing computer-readable instructions for a portable apparatus, wherein the portable apparatus comprises:

a memory;

a user interface;

a first wireless interface configured to execute a first wireless communication with a short range communication apparatus that is different from the portable apparatus, the first wireless communication having a longer communication distance than a short range wireless communication, the first wireless communication conforming to a wireless communication standard which is different from a short range communication standard to which the short range wireless communication conforms, a registration process being performed in the first wireless communication, and short-range-communication-apparatus-identification information of a short range communication apparatus being stored in the memory of the portable apparatus in the registration process; and a second wireless interface configured to execute a second wireless communication with an image forming apparatus that is different from the portable apparatus and the short range communication apparatus, the second wireless communication having a longer communication distance than the short range wireless communication, the computer-readable instructions, when executed by a processor of the portable apparatus, cause the portable apparatus to perform:

sending a registration request to the short range communication apparatus when the first wireless communication is established with a short range communication apparatus whose short-range-communication-apparatus-identification information has not been stored yet in the memory of the portable apparatus;

receiving the short-range-communication-apparatus-identification information from the short range communication apparatus that has received the registration request;

storing the received short-range-communication-apparatus-identification information in the memory of the portable apparatus;

accepting a first operation for instructing an image forming apparatus to form an image via the user interface; and accepting a second operation via the user interface, wherein the second operation is an operation for instructing to execute the second wireless communication with the image forming apparatus via the second wireless interface using connection information, and the short range communication apparatus is an apparatus which communicates the connection information with the image forming apparatus via the short range wireless communication, the computer-readable instructions cause the portable apparatus to further perform:
establishing the first wireless communication between the portable apparatus and the short range communication apparatus;
after the first wireless communication has been established, receiving an executing instruction, the connection information and the short-range-communication-apparatus-identification information from the short range communication apparatus via the first wireless communication, the executing instruction being an instruction for the portable apparatus to establish the second wireless communication with the image forming apparatus using the connection information;
determining whether a sender of the executing instruction, the connection information and the short-range-communication-apparatus-identification information is the registered short range communication apparatus or not by using the received short-range-communication-apparatus-identification information;
causing the second wireless interface not to establish the second wireless communication with the image forming apparatus without intermediation of the short range communication apparatus using the connection information, when it is determined in the determining that the sender is not the registered short range communication apparatus;
causing the second wireless interface to establish the second wireless communication with the image forming apparatus without intermediation of the short range communication apparatus using the connection information, when it is determined in the determining that the sender is the registered short range communication apparatus; and
instructing the image forming apparatus to form the image via the second wireless interface establishing the second wireless communication.

9. The non-transitory computer-readable storage medium as in claim 8, wherein the computer-readable instructions cause the portable apparatus to further perform:
receiving, via the first wireless interface, short-range-communication-apparatus-identification information identifying the short range communication apparatus;
storing the received short-range-communication-apparatus-identification information in the memory; and
determining whether the short-range-communication-apparatus-identification information is stored in the memory or not, and
the second wireless interface is caused to establish the second wireless communication with the image forming apparatus using the connection information received from the short range communication apparatus indicated by the short-range-communication-apparatus-identification information in response to the determining that the short-range-communication-apparatus-identification information is stored in the memory.

10. The non-transitory computer-readable storage medium as in claim 9, wherein
the computer-readable instructions cause the portable apparatus to further perform determining whether or not the received short-range-communication-apparatus-identification information includes portable-program-maker-identification information indicating a manufacturer of the non-transitory computer-readable storage medium, and
the short-range-communication-apparatus-identification information is stored in the memory in response to the determining that the short-range-communication-apparatus-identification information includes the portable-program-manufacturer-identification information.

11. The non-transitory computer-readable storage medium as in claim 8, wherein
the computer-readable instructions cause the portable apparatus to further perform determining whether or not portable-program-manufacturer-identification information indicating a manufacturer of the non-transitory computer-readable storage medium has been received together with the connection information received from the short range communication apparatus via the first wireless interface, and
the second wireless interface is caused to establish the second wireless communication with the image forming apparatus using the connection information in response to the determining that the portable-program-manufacturer-identification information has been received.

12. The non-transitory computer-readable storage medium as in claim 9, wherein
the computer-readable instructions cause the portable apparatus to further perform sending,
via the first wireless interface, a sending instruction for instructing sending of the connection information to the short range communication apparatus identified by the short-range-communication-apparatus-identification information stored in the memory, and
the connection information is received from the short range communication apparatus via the first wireless interface after the sending instruction has been sent to the short range communication apparatus.

13. The non-transitory computer-readable storage medium as in claim 12, wherein
the computer-readable instructions cause the portable apparatus to further perform:
causing a display of the portable apparatus to display a preview image of image data in response to accepting the first operation for selecting the image data; and
determining whether the short-range-communication-apparatus-identification information is stored in the memory or not in response to accepting the first operation, and
the sending instruction is sent in response to the determining that the short-range-communication-apparatus-identification information is stored in the memory.

14. The non-transitory computer-readable storage medium as in claim 12, wherein
the sending instruction is information for instructing an operating system installed in the short range communication apparatus to activate a short range program installed in the short range communication apparatus, and
the short range program is a program for receiving the connection information from the image forming apparatus via the short range wireless communication.

15. The non-transitory computer-readable storage medium as in claim 12, wherein
the computer-readable instructions cause the portable apparatus to further perform causing a display of the portable apparatus to display a preview image of image data in response to accepting the first operation for selecting the image data, and in response to the receiving of the connection information from the short range communication apparatus after the preview image has been displayed in the display, the second wireless interface is caused to establish the second wireless communication and the image forming apparatus is instructed to form the image.

16. The non-transitory computer-readable storage medium as in claim 8, wherein
the computer-readable instructions cause the portable apparatus to further perform:
storing the received connection information in a memory of the portable apparatus;
determining whether the connection information has been stored or not when image data being a target of communication is selected; and
causing a display of the portable apparatus to display a print object for causing the image forming apparatus to execute print of an image represented by the image data in a case where it is determined that the connection information has been stored, the image forming apparatus being capable of establishing the second wireless communication by the stored connection information.

17. A system comprising a short range communication apparatus and a portable apparatus, wherein
the short range communication apparatus comprises:
a short range communication interface configured to execute a short range wireless communication with an image forming apparatus that is different from the short range communication apparatus, the short range wireless communication being established by a trigger that a distance between the short range communication interface and the image forming apparatus becomes equal to or less than a short range distance;
a wireless interface configured to execute a first wireless communication with a portable apparatus that is different from the short range communication apparatus and the image forming apparatus, the first wireless communication having a longer communication distance than the short range wireless communication, the first wireless communication conforming to a wireless communication standard which is different from a short range communication standard to which the short range wireless communication conforms, a registration process being performed in the first wireless communication, and short-range-communication-apparatus-identification information of a short range communication apparatus being stored in a portable apparatus in the registration process;
a first processor; and
a first memory storing first computer-readable instructions therein, the first computer-readable instructions, when executed by the first processor, causing the short range communication apparatus to perform:
establishing the first wireless communication between the wireless interface of the short range communication apparatus and the portable apparatus;
receiving a registration request from the portable apparatus when the first wireless communication is established with the portable apparatus in which the short-range-communication-apparatus-identification information has not been stored yet;
sending the short-range-communication-apparatus-identification information to the portable apparatus that has sent the registration request, such that the sent short-range-communication-apparatus-identification information is stored in the portable apparatus;
establishing the short range wireless communication between the short range communication interface of the short range communication apparatus and the image forming apparatus; and
after the short range wireless communication has been established, communicating connection information with the image forming apparatus via the short range wireless communication, wherein the connection information is necessary information for the portable apparatus to execute second wireless communication with the image forming apparatus without intermediation of the short range communication apparatus,
after the connection information has been communicated, the first computer-readable instructions cause the short range communication apparatus to further perform sending an executing instruction, the communicated connection information and the short-range-communication-apparatus-identification information to the portable apparatus via the first wireless communication,
wherein when it is determined in the portable apparatus that the sending of the executing instruction, the communicated connection information and the short-range-communication-apparatus-identification information is performed by the registered short range communication apparatus by using the sent short-range-communication-apparatus-identification information, the executing instruction causing the portable apparatus to establish the second wireless communication between the portable apparatus and the image forming apparatus without intermediation of the short range communication apparatus using the connection information,
wherein when it is determined in the portable apparatus that the sending of the executing instruction, the communicated connection information and the short-range-communication-apparatus-identification information is not performed by the registered short range communication apparatus by using the sent short-range-communication-apparatus-identification information, the executing instruction does not cause the portable apparatus to establish the second wireless communication,
the portable apparatus is an apparatus being capable of executing a portable program for instructing the image forming apparatus to form an image via the second wireless communication, and
the second wireless communication has a longer communication distance than the short range wireless communication,
the portable apparatus comprises:
a user interface;
a first wireless interface configured to execute the first wireless communication, the registration process being performed in the first wireless communication;
a second wireless interface configured to execute the second wireless communication;
a second processor; and
a second memory storing second computer-readable instructions therein, the second computer-readable instructions, when executed by the second processor, causing the portable apparatus to perform:

sending a registration request to the short range communication apparatus when the first wireless communication is established with a short range communication apparatus whose short-range-communication-apparatus-identification information has not been stored yet in the second memory of the portable apparatus;

receiving the short-range-communication-apparatus-identification information from the short range communication apparatus that has received the registration request;

storing the received short-range-communication-apparatus-identification in the second memory of the portable apparatus;

accepting, via the user interface, a first operation for instructing the image forming apparatus to form an image; and accepting a second operation via the user interface, wherein the second operation is an operation for instructing to execute the second wireless communication with the image forming apparatus via the second wireless interface using the connection information, the second computer-readable instructions cause the portable apparatus to further perform:

establishing the first wireless communication between the portable apparatus and the short range communication apparatus;

after the first wireless communication has been established, receiving an executing instruction, the connection information and the short-range-communication-apparatus-identification information from the short range communication apparatus via the first wireless communication, the executing instruction being an instruction for the portable program to establish the second wireless communication with the image forming apparatus using the connection information;

determining whether a sender of the executing instruction, the connection information and the short-range-communication-apparatus-identification information is the registered short range communication apparatus or not by using the received short-range-communication-apparatus-identification information;

causing the second wireless interface not to establish the second wireless communication with the image forming apparatus without intermediation of the short range communication apparatus using the connection information, when it is determined in the determining that the sender is not the registered short range communication apparatus;

causing the second wireless interface to establish the second wireless communication with the image forming apparatus without intermediation of the short range communication apparatus using the connection information, when it is determined in the determining that the sender is the registered short range communication apparatus; and instructing the image forming apparatus to form the image via the second wireless interface establishing the second wireless communication.

18. The system as in claim 17, wherein
the short range communication apparatus is a wrist band type apparatus, and the portable apparatus is a smart phone or a tablet type apparatus.

* * * * *